(12) United States Patent
Burns et al.

(10) Patent No.: US 8,612,852 B2
(45) Date of Patent: Dec. 17, 2013

(54) OMNIPORTLET-DECLARATIVELY PUBLISH DATA IN A PORTAL WITHOUT CODE

(75) Inventors: Stephen Burns, Palo Alto, CA (US); Robin Fisher, Palo Alto, CA (US)

(73) Assignee: Oracle International Corporation, Redwoods Shores, CA (US)

( * ) Notice: Subject to any disclaimer, the term of this patent is extended or adjusted under 35 U.S.C. 154(b) by 1632 days.

(21) Appl. No.: 10/676,829

(22) Filed: Sep. 30, 2003

(65) Prior Publication Data

US 2005/0055634 A1 Mar. 10, 2005

Related U.S. Application Data (60) Provisional application No. 60/501,492, filed on Sep. 8, 2003.

(51) Int. Cl.
*G06F 17/00* (2006.01)

(52) U.S. Cl.
USPC ............ 715/246; 715/744; 715/747; 715/234

(58) Field of Classification Search
USPC ......... 715/517, 523, 513, 742, 744, 234, 235, 715/236, 243, 255, 201, 204, 246, 747; 717/109; 709/217, 218, 227
See application file for complete search history.

(56) References Cited

U.S. PATENT DOCUMENTS

| | | | | |
|---|---|---|---|---|
| 5,983,227 A * | 11/1999 | Nazem et al. | | 707/10 |
| 6,023,714 A * | 2/2000 | Hill et al. | | 715/513 |
| 6,278,448 B1 * | 8/2001 | Brown et al. | | 715/866 |
| 6,327,628 B1 * | 12/2001 | Anuff et al. | | 719/311 |
| 6,538,673 B1 * | 3/2003 | Maslov | | 715/853 |
| 6,631,497 B1 * | 10/2003 | Jamshidi et al. | | 715/205 |
| 7,085,994 B2 * | 8/2006 | Gvily | | 715/500.1 |
| 7,085,999 B2 * | 8/2006 | Maeda et al. | | 715/236 |
| 7,266,806 B2 * | 9/2007 | Choi et al. | | 717/108 |
| 7,502,833 B2 * | 3/2009 | Schaeck | | 709/217 |
| 2002/0029296 A1 * | 3/2002 | Anuff et al. | | 709/311 |
| 2002/0169789 A1 * | 11/2002 | Kutay et al. | | 707/104.1 |
| 2003/0110448 A1 * | 6/2003 | Haut et al. | | 715/513 |
| 2003/0117437 A1 * | 6/2003 | Cook et al. | | 345/764 |
| 2003/0145275 A1 * | 7/2003 | Qian et al. | | 715/500 |
| 2003/0167315 A1 * | 9/2003 | Chowdhry et al. | | 709/218 |
| 2004/0010598 A1 * | 1/2004 | Bales et al. | | 709/228 |
| 2004/0068554 A1 * | 4/2004 | Bales et al. | | 709/218 |
| 2004/0123238 A1 * | 6/2004 | Hefetz et al. | | 715/513 |
| 2004/0123244 A1 * | 6/2004 | Campbell et al. | | 715/517 |
| 2004/0183831 A1 * | 9/2004 | Ritchy et al. | | 345/762 |
| 2005/0120288 A1 * | 6/2005 | Boehme et al. | | 715/500 |
| 2006/0010390 A1 * | 1/2006 | Guido et al. | | 715/742 |
| 2006/0015846 A1 * | 1/2006 | Fraleigh et al. | | 717/109 |
| 2006/0150094 A1 * | 7/2006 | Patrawala | | 715/520 |
| 2006/0248112 A1 * | 11/2006 | Williams et al. | | 707/102 |
| 2007/0283020 A1 * | 12/2007 | Chowdary et al. | | 709/227 |

OTHER PUBLICATIONS

Creating Web Reports with the Web Publisher Wizard, Jan. 2002, SAP.*

* cited by examiner

*Primary Examiner* — Adam M Queler
(74) *Attorney, Agent, or Firm* — Kilpatrick Townsend & Stockton LLP (57) ABSTRACT

Techniques for generating a page from a declarative specification are provided. An interface is provided that enables a user to declaratively specify a data source. Also, an interface is provided that allows a user to declaratively specify layout information for data from the data source. A page is then generated based on the declarative specification for the data source and the layout information.

24 Claims, 12 Drawing Sheets

OMNIPORTLET-DECLARATIVELY PUBLISH DATA IN A PORTAL WITHOUT CODE

CROSS-REFERENCES TO RELATED APPLICATIONS

The present application is a non-provisional of and claims priority from U.S. Provisional Application No. 60/501,492, filed Sep. 8, 2003, the entire contents of which are herein incorporated by reference for all purposes.

BACKGROUND OF THE INVENTION

The present invention generally relates to web page design and more specifically to methods and apparatus for generating a page to publish data using a declarative specification.

A portal is designed to publish information for access by users. In order to publish the information, a web-based page is typically created. A page designer first determines how the web-based page should look. For example, the page designer may determine which data to display and how it should be displayed on the page. The page designer's preferences for the page are then communicated to a page developer, who then creates software code that generates a page to publish the data according to the page designer's preferences.

A page designer is typically a non-technical person who does not know how to write software code that will generate the web page. Rather, the page designer has to rely on a page developer to write the software code to generate the page. The page designer has to design the page and communicate with the page developer, who then develops the page and write the software code to generate the page according to the page designer's preferences. Development thus becomes a bottleneck for the page designer.

The page developer may attempt to pre-build pages for the portal in order to alleviate the bottleneck. The pre-built pages allow a page designer to lay out the data on the page without writing software code. However, the pre-built pages are created to display a certain subset of data. If the page designer wants to publish data other than the supported data for the pre-built pages, then a page developer has to create another page. Accordingly, the pre-built pages are not flexible on which data may be displayed in the page.

BRIEF SUMMARY OF THE INVENTION

The present invention generally relates to generating a page from a declarative specification. An interface is provided that enables a user to declaratively specify a data source. Also, an interface is provided that allows a user to declaratively specify layout information for data from the data source. A page is then generated based on the declarative specification for the data source and the layout information.

In one embodiment, a method for generating a page is provided. The method comprises: determining a data source specification and a layout specification for the page, the data source specification and layout specification being declaratively specified by a user, the data source specification including access information for a data source; retrieving data for the data source based on the data source specification and the access information; determining a layout for the data based on the layout specification; and generating the page using the data and the determined layout.

In another embodiment, a method for generating a graphical user interface (GUI) is provided. The method comprises: providing a data source interface that enables a user to declaratively specify access information for a data source; determining a declarative specification for the data source; retrieving data for the data source using the access information; providing a layout interface that enables the user to declaratively specify a layout for the determined data; determining a layout specification for the determined data; and generating a graphical user interface based on the declarative specification for the data source and the layout specification for the determined data.

In yet another embodiment, a method for declaratively generating a page using an interface if provided. The method comprises: receiving a declarative specification of access information for a data source, wherein the access information is input by a user; retrieving data using the access information for the data source; determining layout information for data from the data source; and generating a page using the retrieved data and the layout information.

A further understanding of the nature and advantages of the invention herein may be realized by reference of the remaining portions in the specifications and the attached drawings.

DETAILED DESCRIPTION OF THE INVENTION

Embodiments of the present invention will be described as generating portlets for a portal page. In one embodiment, a portlet is a web-based page or window that is configured to display data from a data source. A portal page is any web-based page that may display one or more portlets. Although embodiments of the present invention describe portlets and portals, it will be understood that the techniques described herein may be used to generate any page that is generated using software code, such as a web page or a graphical user interface.

Figure 1:
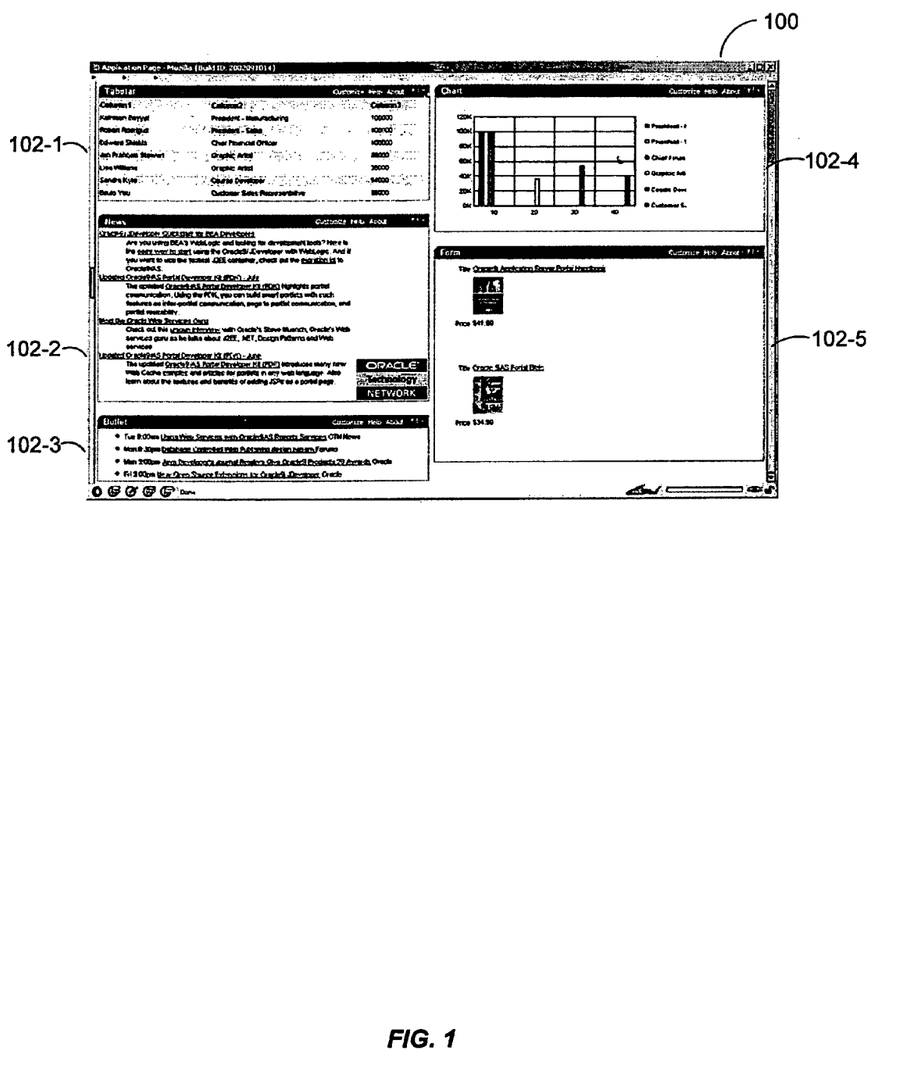
FIG. 1 illustrates a portal page that includes one or more portlets according to one embodiment of the present invention.

FIG. 1 illustrates a portal page 100 that includes one or more portlets 102 according to one embodiment of the present invention. In one embodiment, portal page 100 may be a web-based page. Although portal 100 is described as a web page, portal 100 may be any graphical user interface.

Portlets 102 are depicted as portlets 102-1, 102-2, 102-3, 102-4, and 102-5. Each portlet 102 is configured to display data from a data source according to a specified layout. The data source and layout for data from the data source are declaratively specified by a user. Accordingly, in order to generate a portlet 102, the software code does not need to be written. Rather, a user can declaratively specify the data source and layout. A portlet 102 is then generated using the declarative specifications.

Portal page 100 may include multiple portlets 102. Thus, data from various sources may be published on portal page 100. Portlets 102 may be independent web-based pages. Also, data parameters in different portlets 102 on portal page 100 may be linked together or be dependent on one another. Although portlets 102 are described, it will be understood that any kind of graphical user interface or page may be generated.

Figure 2:
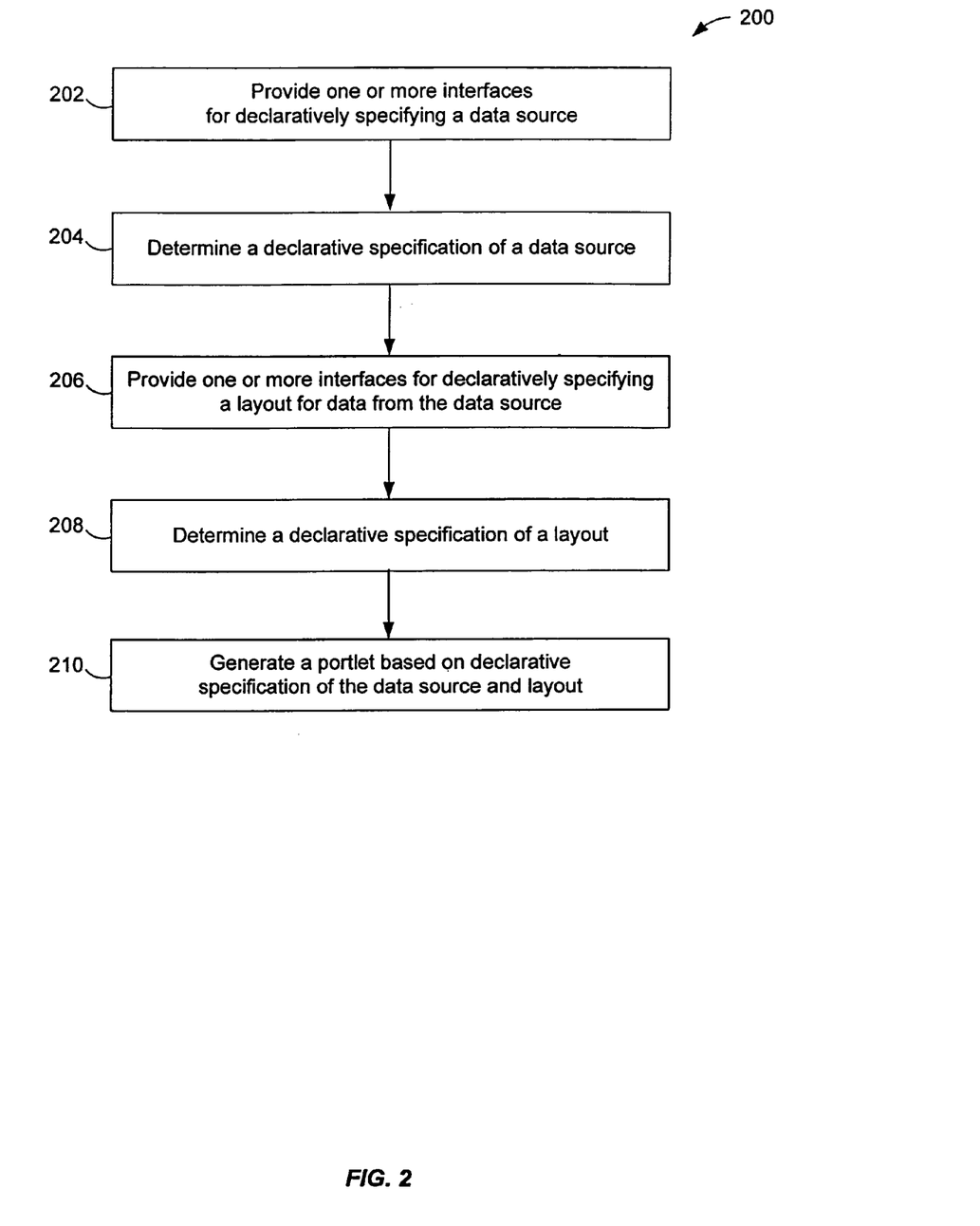
FIG. 2 illustrates a simplified flowchart of a method for generating a portlet according to one embodiment of the present invention.

FIG. 2 illustrates a simplified flowchart 200 of a method for generating portlet 102 according to one embodiment of the present invention. In step 202, one or more interfaces are provided for declaratively specifying a data source. In one embodiment, the interfaces are included in a web-based wizard that guides a user through declarative steps that specify the data source.

In one embodiment, access information for any data source may be provided by a user. The access information may be a link to any data (e.g., a uniform resource locator (URL)), a storage location, or any other information that is needed to access data for the data source. Additionally, as will be described later, a user may specify a data type and also filter data from the data source to specify which data should be displayed in a portlet 102.

In step 204, a declarative specification of the data source is determined. When a user declaratively specifies the data source in step 202, a declarative specification of the data source is determined from the input information. The specification includes information that is needed to generate a portlet 102 with the specified data.

In step 206, one or more interfaces for specifying a layout for data from the data source are provided. The one or more interfaces allow a user to declaratively specify a layout for data from the data source. In one embodiment, data is retrieved using the access information specified for the data source and displayed in the one or more interfaces. The user can then declaratively specify how the data should be displayed in portlet 102. For example, layout types, such as a tabular layout, chart layout, news layout, form layout, and bullet layout may be provided for a user to choose from. The user can then choose how to display or layout the data in a portlet 102.

In one embodiment, the specification of the layout is separated from the specification of the data source. By separating the specification of the data source from the layout, a layout may be changed without having to rebuild a portlet 102. For example, data from the data source may be rendered initially as a tabular layout and then changed to a chart layout by re-specifying the layout. Because the data source specification is separated from the layout specification, the data may then be reformatted for the changed layout type without designing a new page. A portlet 102 is just created with the new layout for data from the data source.

In step 208, a declarative specification of a layout is determined. When a user declaratively specifies the layout in step 206, a declarative specification of the layout is determined from the input information. The specification of the layout includes information needed to generate a portlet 102 with the specified layout preferences.

In step 210, a portlet 102 is generated based on the declarative specification of the data source and the layout. Portlet 102 is generated with the information that was declaratively specified. In one embodiment, software code uses the declarative specification to generate portlet 102. For example, a data driver or renderer generates portlet 102 using the information that was declaratively specified. The data driver and outputted interfaces are developed such that information declaratively defined using the interfaces may be interpreted by the data driver to generate portlet 102. In one embodiment, the declarative specification comprises meta-data that is used by the data driver to generate portlet 102. In another embodiment, software code is generated using the declarative specification where the software code generates portlet 102.

In one embodiment, the user is not restricted to creating portlet 102 with specific data. Rather, any data source may have been declaratively specified in steps 202 and 204. For example, conventionally, a developer may create a page that supports only weather data from a first source. A page designer would then be restricted to creating a page with only that weather data. However, using embodiments of the present invention, a user may specify access information to any weather data and create a portlet 102 to display the specified weather data.

Figure 3:
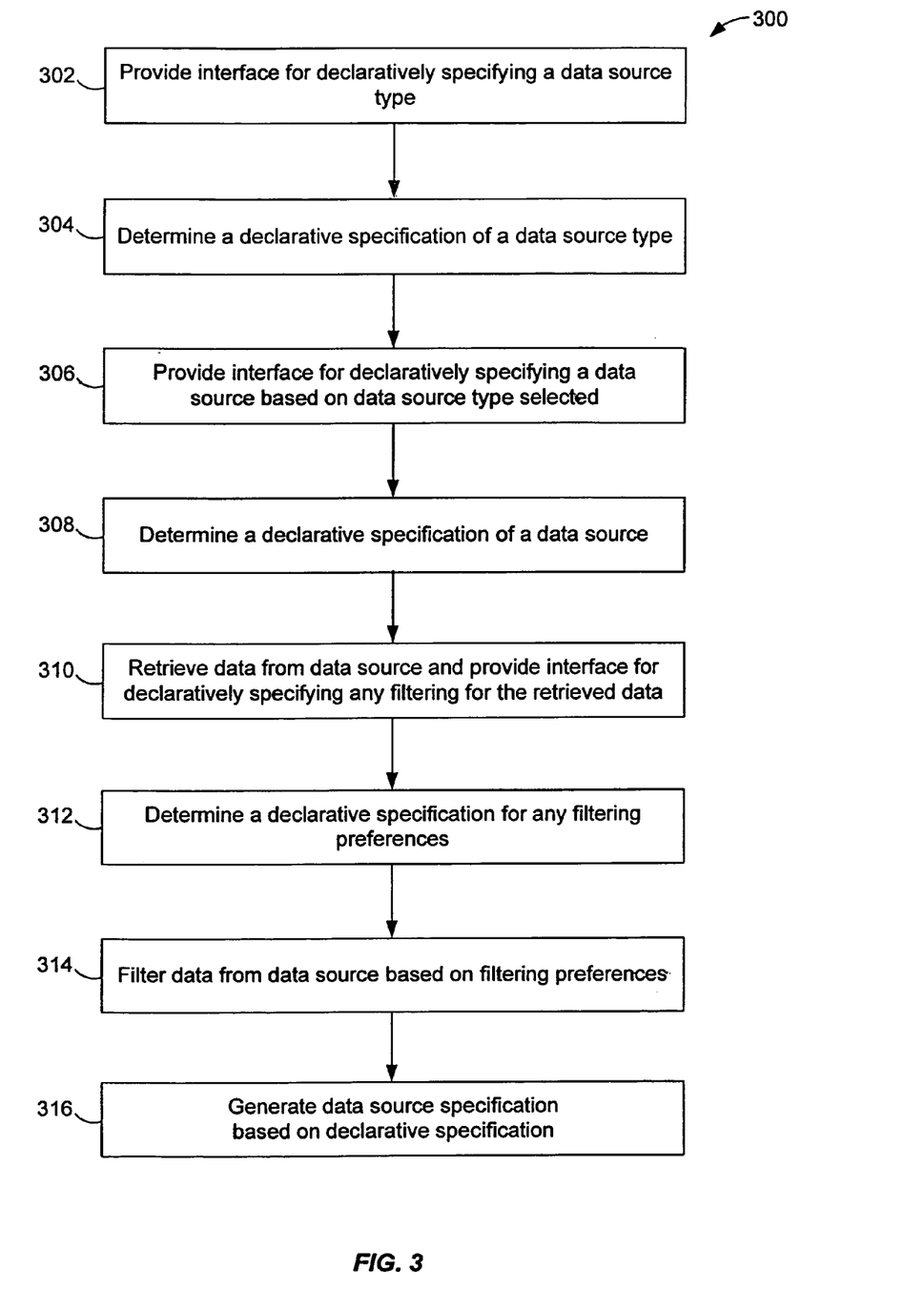
FIG. 3 depicts a simplified flow chart of a method for specifying a declarative specification of a data source according to one embodiment of the present invention.

FIG. 3 depicts a simplified flow chart 300 of a method for specifying a declarative specification of a data source according to one embodiment of the present invention. In step 302, an interface for declaratively specifying the data source type is provided. In one embodiment, the data types provided include a spreadsheet, structured query language (SQL), extensible markup language (XML), web service, and web page data types. Although the above data types are described, it will be understood that a person skilled in the art will appreciate other data types that may be used.

Data stored in spreadsheets is one type of data type that is supported. Typically, spreadsheets are a common method of storing small data sets. Data in a spreadsheet is often created as a comma separated value (CSV) file. Embodiments of the present invention are configured to retrieve data from a CSV file or any other file that stores data in a spreadsheet format.

A SQL data type includes any data stored in a relational database. In one embodiment, JDBC™ drivers are used to access a relational database. For example, SQL statements are generated and used to retrieve data for a specified data source.

The XML data type allows a user to publish data from an XML data source. Typically, a URL for an XML data source is provided and data is retrieved from a storage location associated with the URL. The structure of the XML data source may be specified by a user. For example, an XML schema or XML style sheet that describes the structure of the data may be specified. Also, embodiments of the present invention may determine the data structure for the XML data source. In one embodiment, data retrieved from an XML data type is expected in a ROWSET/ROW structure. Although a ROWSET/ROW structure is used, it will be understood that any hierarchical structure may be supported.

A web service data type is a service that may be accessed over the Internet using standard web protocols, such as SOAP and HTTP. Web service protocols are typically non-platform and non-language specific. For example, a web service may be a streaming data service for stock quotes, a news brief, etc.

In one embodiment, the web service data type includes the types of document/literal and remote procedural call (RPC)/encoded. Document and RPC are different mechanisms for communicating with web services. It will be understood that other mechanisms to communicate with web services will be appreciated and supported.

In one embodiment, web services data is parsed using the ROWSET/ROW format. Also, a user can specify the format;

for example, a user may specify a link to a file (e.g., an XSL or XML schema file) that specifies the format of the web service data type.

A web page data type includes any information that may be found on a web page. The web page type enables a user to capture data from a web-based application. The data from a web page may be selected and reformatted.

In step 304, a declarative specification of the data source type is determined. When a user declaratively specifies the data source type in step 302, a declarative specification of the data source type is determined from the input information. The declarative specification includes information that is used to generate a portlet 102 for the data source type.

Figure 6A:
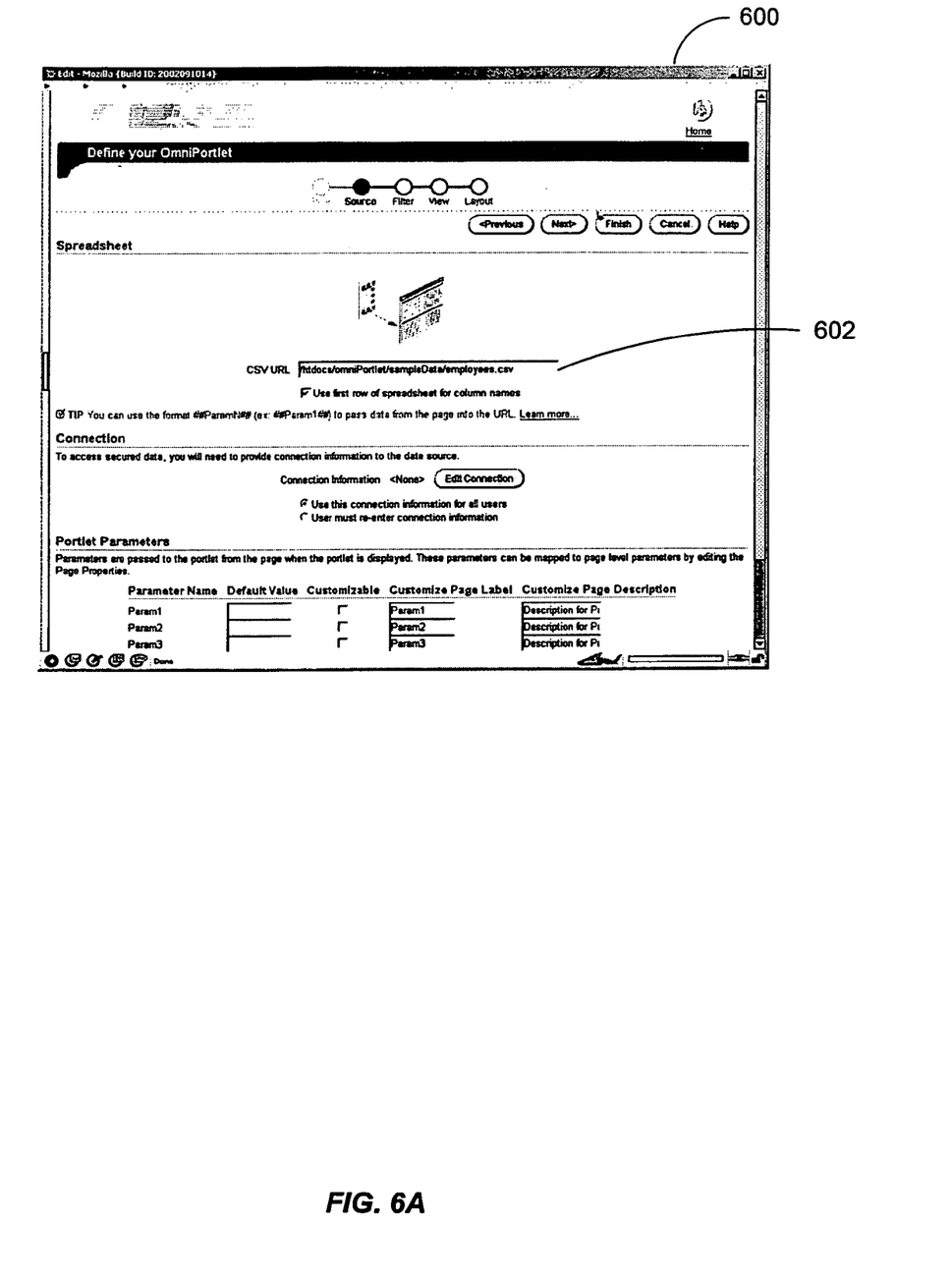
FIGS. 6A-6E depict interfaces for declaratively specifying data sources according to one embodiment of the present invention.

In step 306, an interface for specifying a data source based on the data source type selected is provided. Depending on the data type selected, the access information required to retrieve data for a data source may be different. For example, for a spreadsheet, a storage location for the spreadsheet or a URL may be provided as access information. FIG. 6A depicts an interface 600 for declaratively specifying a spreadsheet data source according to one embodiment of the present invention. As shown, access information may be specified in an entry 602.

Figure 6B:
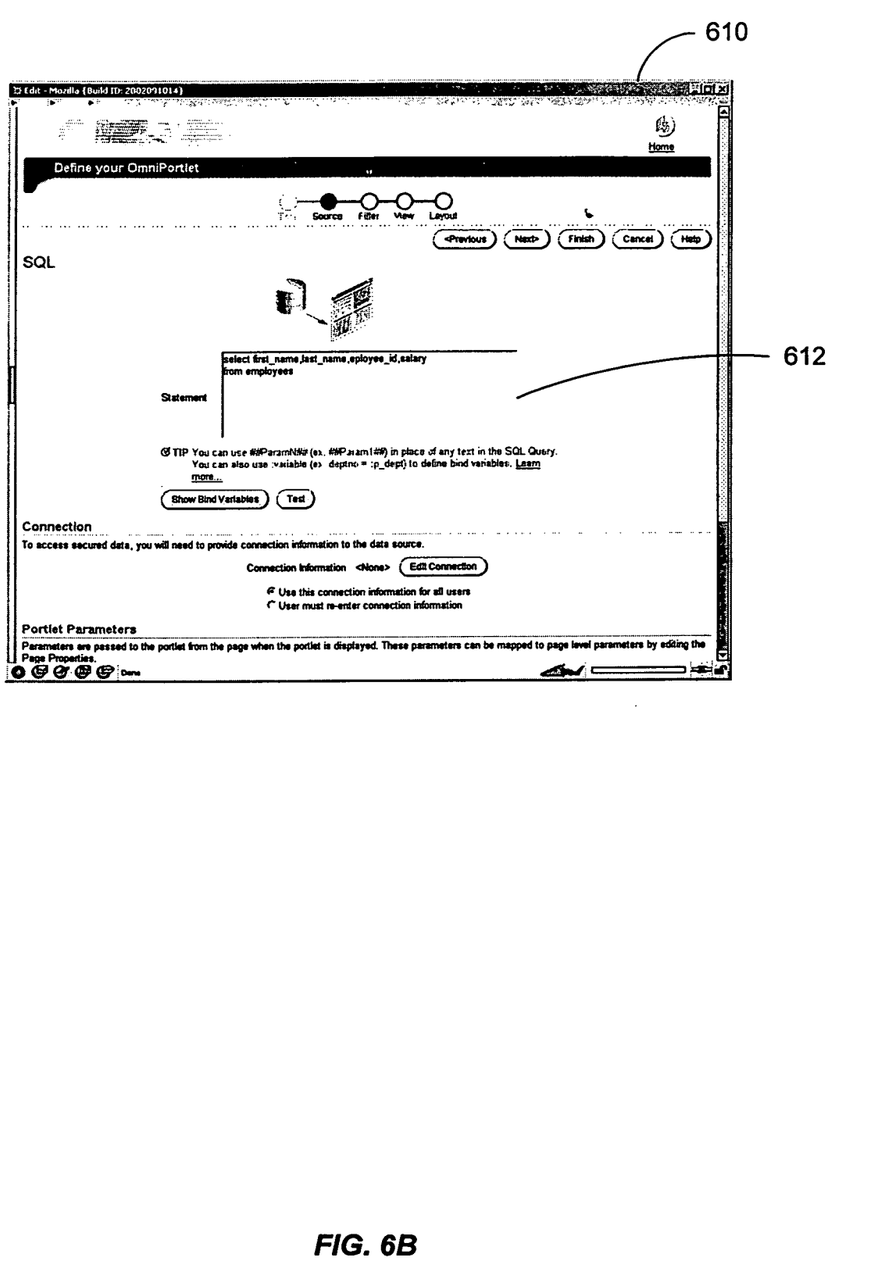

For a SQL data type, a SQL statement may be provided that will retrieve data from a SQL database from a relational database. FIG. 6B depicts an interface 610 for declaratively specifying a SQL data source. As shown, access information (e.g., a SQL statement) for data in a relational database may be provided in an entry 612. The SQL statement may be used to retrieve data from a data source specified in the SQL statement.

For an XML data type, a link (e.g., a URL) to the XML data is specified. Also, information that describes how the data is stored may also be specified. For example, an XML style sheet (XSL) or an XML schema that describes the data structure of the data may be specified.

Figure 6C:
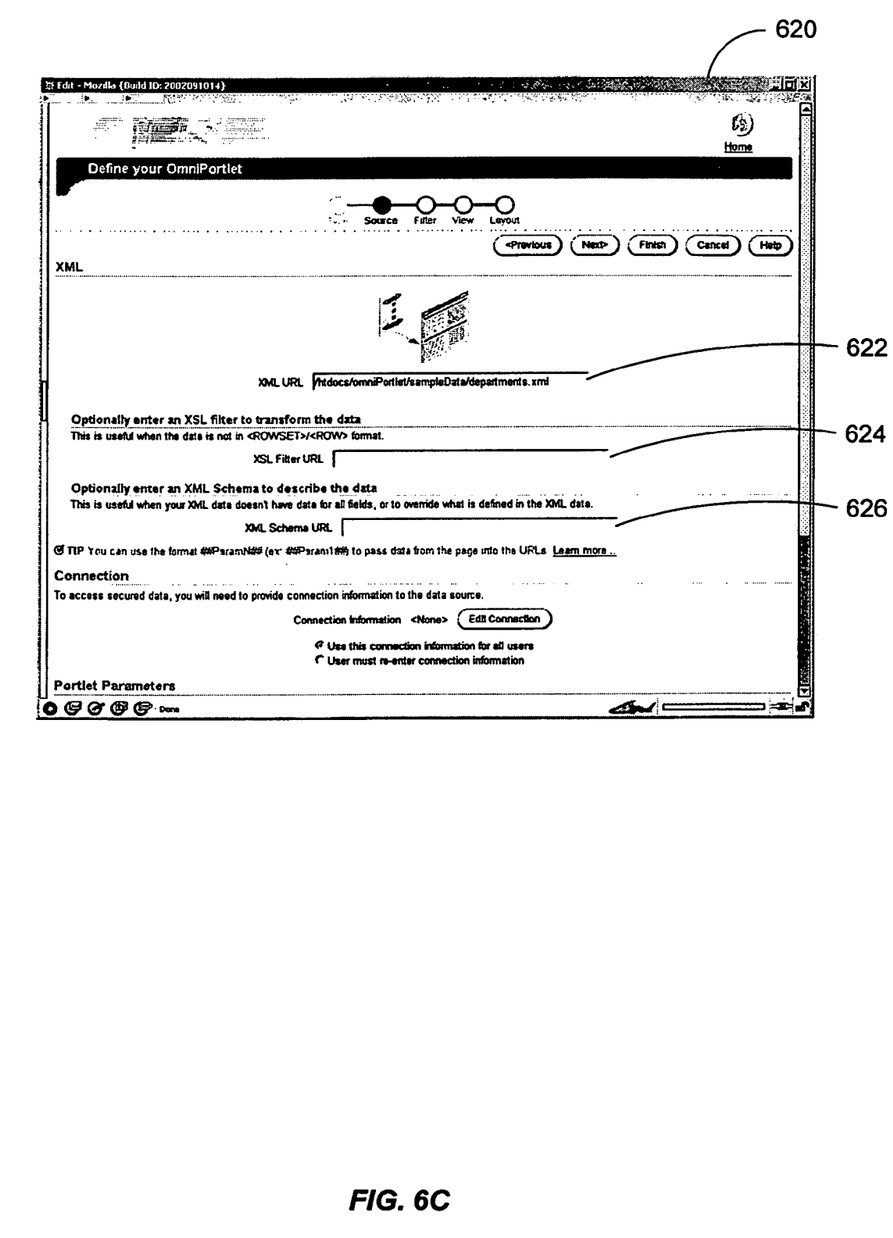

FIG. 6C depicts an interface 620 for declaratively specifying an XML data source according to one embodiment of the present invention. Access information may be entered in an entry 622 for the XML data source. As shown, an XML URL has been entered in entry 622. Also, an entry 624 is provided that allows a user to enter a link to an XSL filter URL. The XSL filter describes the data structure of the XML data source. Also, an entry 626 is provided for a link to an XML schema that describes the data structure of the XML data source. Entries 624 and 626 may be used if the data are stored in a ROWSET/ROW format. Embodiments of the present invention are configured to retrieve data in that format; however, an XSL or XML schema may be used if data are in a different format than ROWSET/ROW.

For a web services data type, a link (e.g., a URL) to the web service may be specified. A user may also specify an XSL file or XML schema that describes the data structure of data from the web service.

Figure 6D:
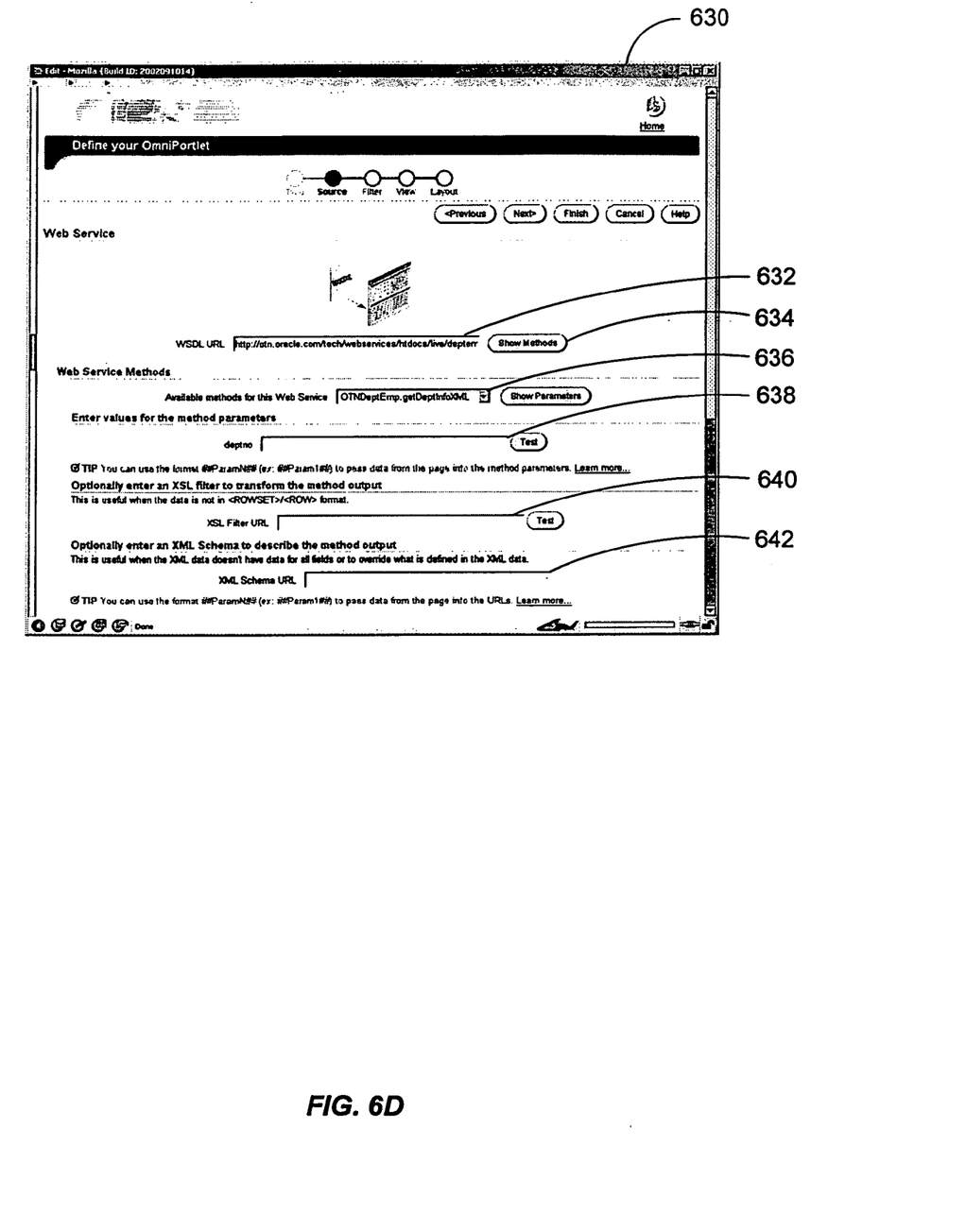

FIG. 6D depicts an interface 630 for declaratively specifying a web service data source according to one embodiment of the present invention. Access information for the web server data source may be provided in an entry 632. As shown, a URL to a web service has been inputted in entry 632. The URL may be to a web service description language (WDSL) that describes the web service, specifies the methods that are available to be called and the parameters that are expected, and a description of the data. Once the access information is inputted, a Web Service methods button 634 may be selected. Different methods 636 may then be determined for the web service. In one embodiment, the methods provide multiple operations that may be called to execute and return results.

The user may select which operation he or she is interested in and the operations are called to retrieve data. Parameters for the method may be provided in an entry 638. Once the user has selected a method (or operation), the user may enter parameters (also referred to as parts) to pass to that method. The WebService's WSDL (Web Services Description Language) is parsed to locate all the methods (or operations) that can be called and the associated parameters (parts) for each method in order to retrieve specified data.

Also, an XSL link may be inputted in an entry 640 and/or an XML schema may be inputted in an entry 642 that describes the data structure of the data. Entries 640 and 642 may be used if the data are stored in a ROWSET/ROW format. Embodiments of the present invention are configured to retrieve data in that format; however, an XSL or XML schema may be used if data are in a different format than ROWSET/ROW.

For the web page data type, a portion of a web page may be selected and data from that selection is retrieved. Data from the web page is retrieved and displayed. A user may then select columns of data from the displayed data that a user desires to publish in portlet 102.

Figure 6E:
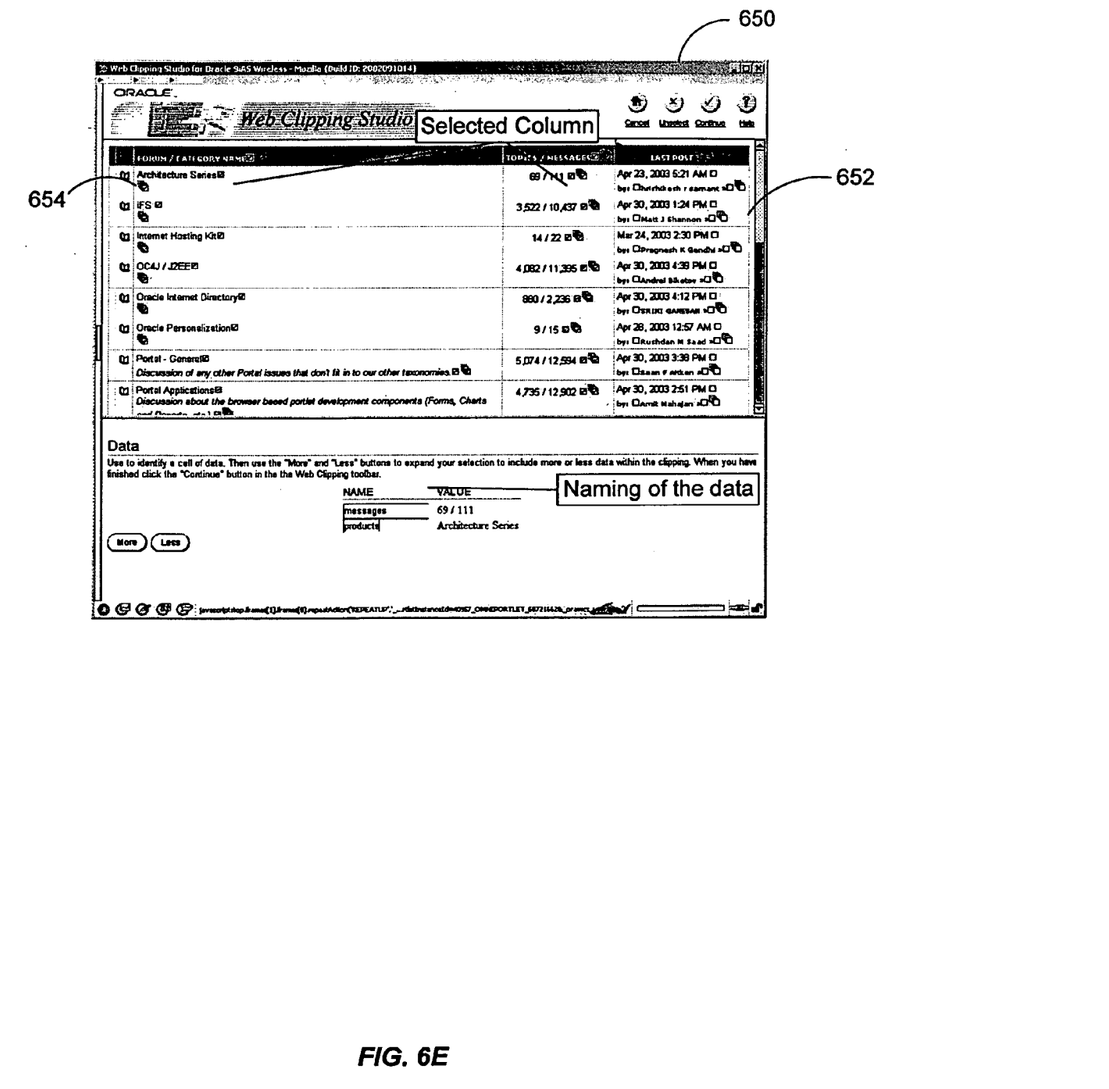

FIG. 6E depicts an interface 650 for declaratively specifying a web page data source according to one embodiment of the present invention. When a web page or part of a web page is selected, data from that web page is retrieved and displayed in a window 652. Check boxes 654 are provided for data retrieved. In one embodiment, check boxes 654 are provided for columns of data from the web page. A user may then select the data that is desired using check boxes 654.

In one embodiment, access to secure data is supported for all data sources described above. Connection information may be specified if a data source is secured. For example, login information (e.g., a username and password) may be needed to access the data source. In this case, a user may provide the information, which is used to access the secure data. Also, data protected by HTTP authentication may be accessed.

In one embodiment, portlet 102 parameters may also be provided for all the data sources described above. The parameters may be used to specify which data is returned from a data source. For example, the parameters may be used to specify that only data from a "department 10" should be returned. This allows filtering to be done at the data source. In another embodiment, filtering may be done with data received from the data source, as described below.

Referring back to FIG. 3, in step 308, a declarative specification of the data source is determined. When a user declaratively specifies the data source in step 306, a declarative specification of the data source is determined from the input information. In one embodiment, the access information specified in step 306 is determined.

In step 310, data is retrieved from the specified data source and an interface is provided for specifying any filtering for the retrieved data. The interface allows a user to filter and/or sort the data that was retrieved. The filtering options provided in this step allow a user to filter data for data retrieved using the access information provided. A user may filter the data on a different level by specifying access information for the data source that only retrieves data that is desired. However, if this is not be done, filtering options for filtering the retrieved data may be used.

Figure 7:
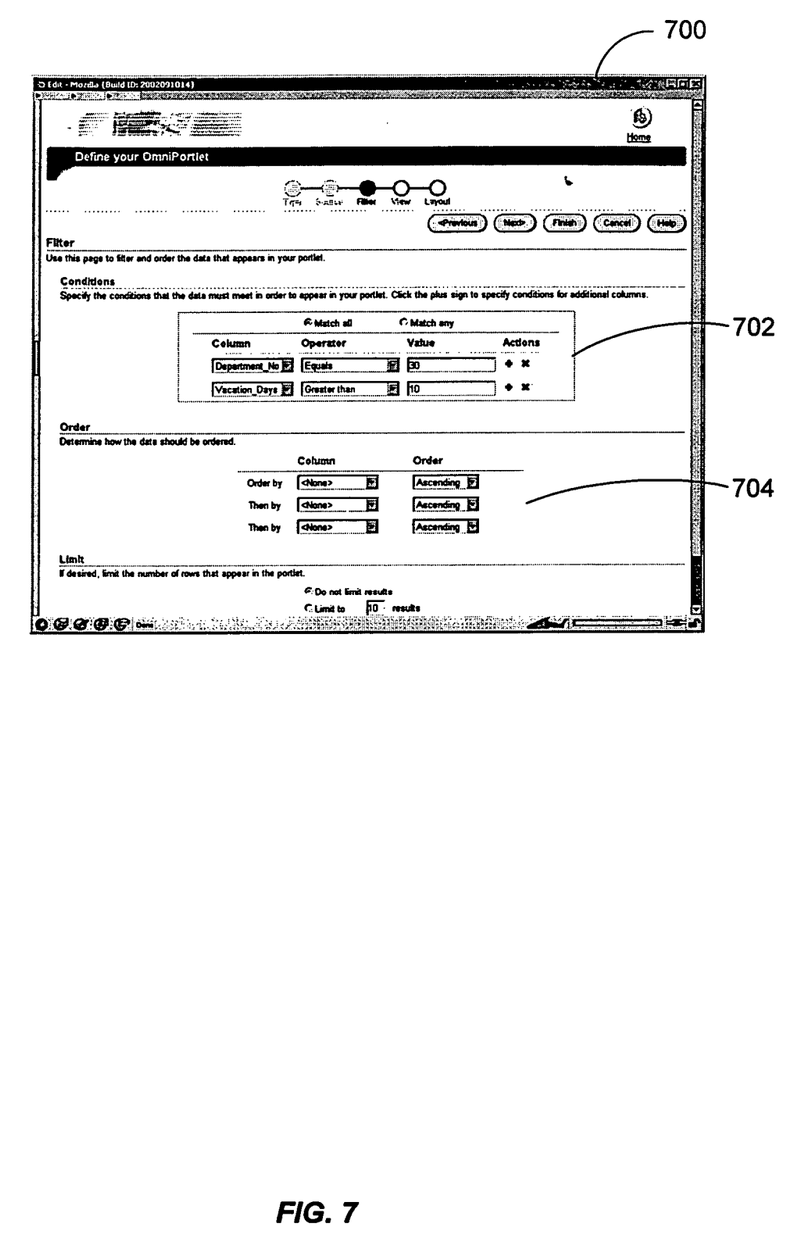
FIG. 7 depicts an interface for declaratively specifying filtered preferences according to one embodiment of the present invention.

FIG. 7 depicts an interface 700 for declaratively specifying filtered preferences according to one embodiment of the present invention. As shown, conditions may be specified in entries 702 that specify which data should be displayed in portlet 102. The conditions may specify specific data to include or may set conditions that will filter data automatically according to the conditions. For example, filtering may be used to selected data from a column that is less than a certain value. Also, the order of data displayed in portlet 102 may also be specified in entries 704.

In step 312, a declarative specification is determined for any filtering preferences. When a user declaratively specifies the data source type in step 310, a declarative specification of the data source is determined from the input information. The declarative specification includes information that is used to generate a portlet 102 with the specified filtering preferences.

In step 314, data from the data source is filtered based on the filtering preferences. Thus, a user has declaratively specified a data source and any access information that is needed to access the data from the data source. Also, the data retrieved is filtered to determine data that is desired by the user.

In step 316, the data source specification is generated based on the declarative specifications determined in steps 308 and 312. In one embodiment, the data source specification may be information that is used to generate a portlet 102 with data that a user declaratively specified.

Figure 4:
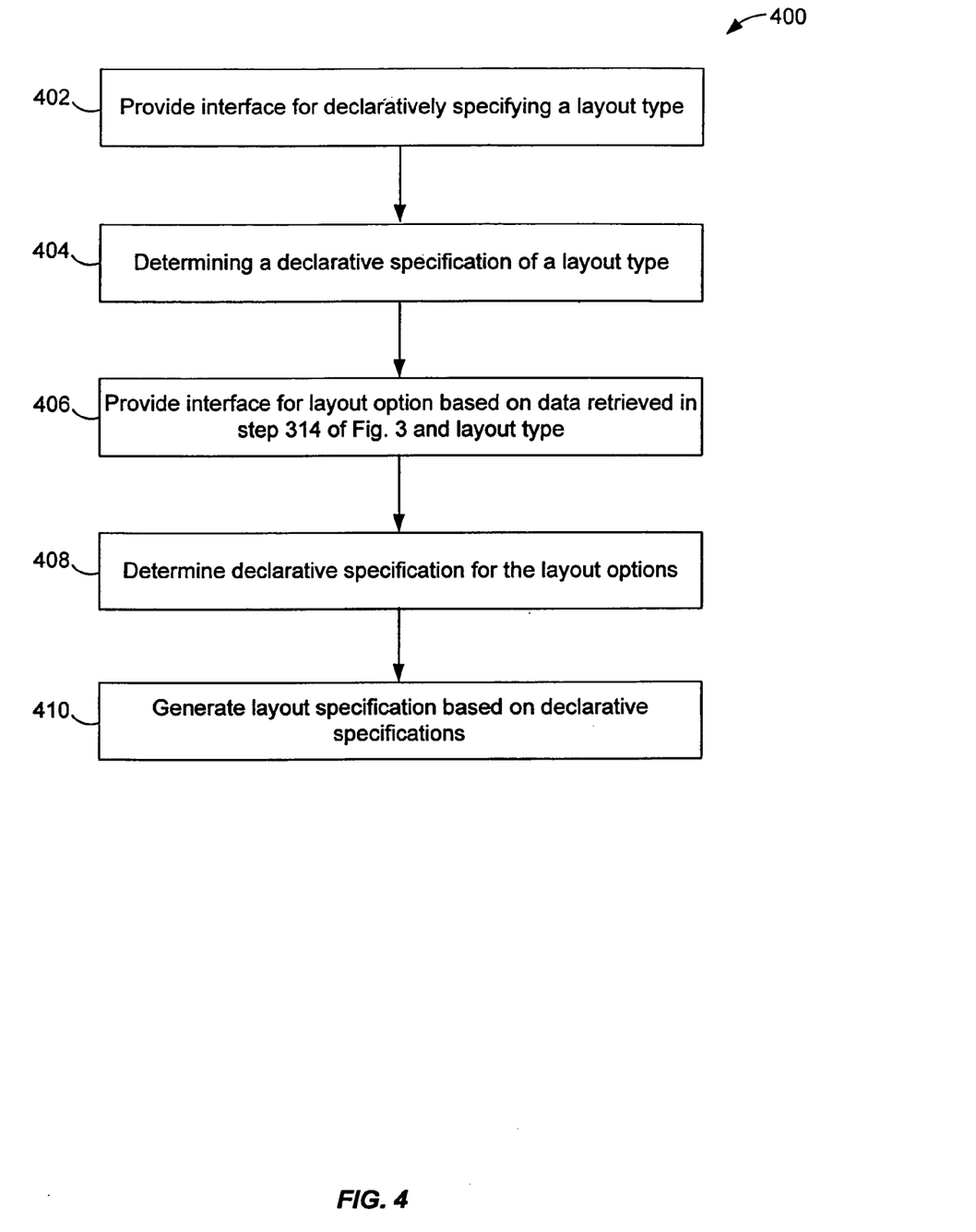
FIG. 4 illustrates a simplified flowchart a method for specifying a declarative specification of a layout according to one embodiment of the present invention.

FIG. 4 illustrates a simplified flowchart 400 a method for specifying a declarative specification of a layout according to one embodiment of the present invention. In step 402, an interface for declaratively specifying a layout type is provided. In one embodiment, the layout type may include a tabular, chart, news, form, and bullet layout type. Although the above layout types are described, it will be understood that a person skilled in the art will appreciate other layout types that may be provided.

FIG. 1 depicts portlets 102 that include the above layout types. For example, portlet 102-1 depicts a tabular layout type; portlet 102-2 depicts a news layout type; portlet 102-3 depicts a bullet layout type; portlet 104-4 depicts a chart layout type; and portlet 102-5 depicts a form layout type.

In step 404, a declarative specification of the layout type is determined. When a user declaratively specifies the layout type in step 402, a declarative specification of the layout type is determined from the input information. The declarative specification includes information that is used to generate a portlet 102 with the specified layout type.

In step 406, an interface is provided for layout options based on the data retrieved in step 314 of FIG. 3 and the layout type selected in step 402. For each layout type, different layout options may be provided. For example, for a tabular layout, a user may select whether alternating colors for each row should be used. For a news layout, a user may select whether an image (typically the image of the news provider) is shown or news is shown in an automatic scrolling zone. For the bullet layout, a bullet format, such as disk, number, letter, roman numerals, etc., may be provided. For a form layout, whether the form fields are horizontal or vertical may be provided. For the chart layout, the type of chart (e.g., bar, pie, line) and if the data is already grouped, which column it is grouped by, may be provided. Although the above layout options are described, it will be understood that a person skilled in the art will appreciate other layout options that may be provided in the interface for selection by a user. For example, a user may specify whether a column should be displayed in a specific format such as plain text, HTML, as an image, as a button, or as a field. In one example, a user may select that a data source that contains a URL for an image should be displayed as the image.

Also, a user may choose an option that allows a hyperlink to be used for data retrieved. For example, a hyperlink may be provided so that when selected in portlet 102, an action may occur, such as jump to another URL or jump to a page associated with the URL that includes data.

Figure 8:
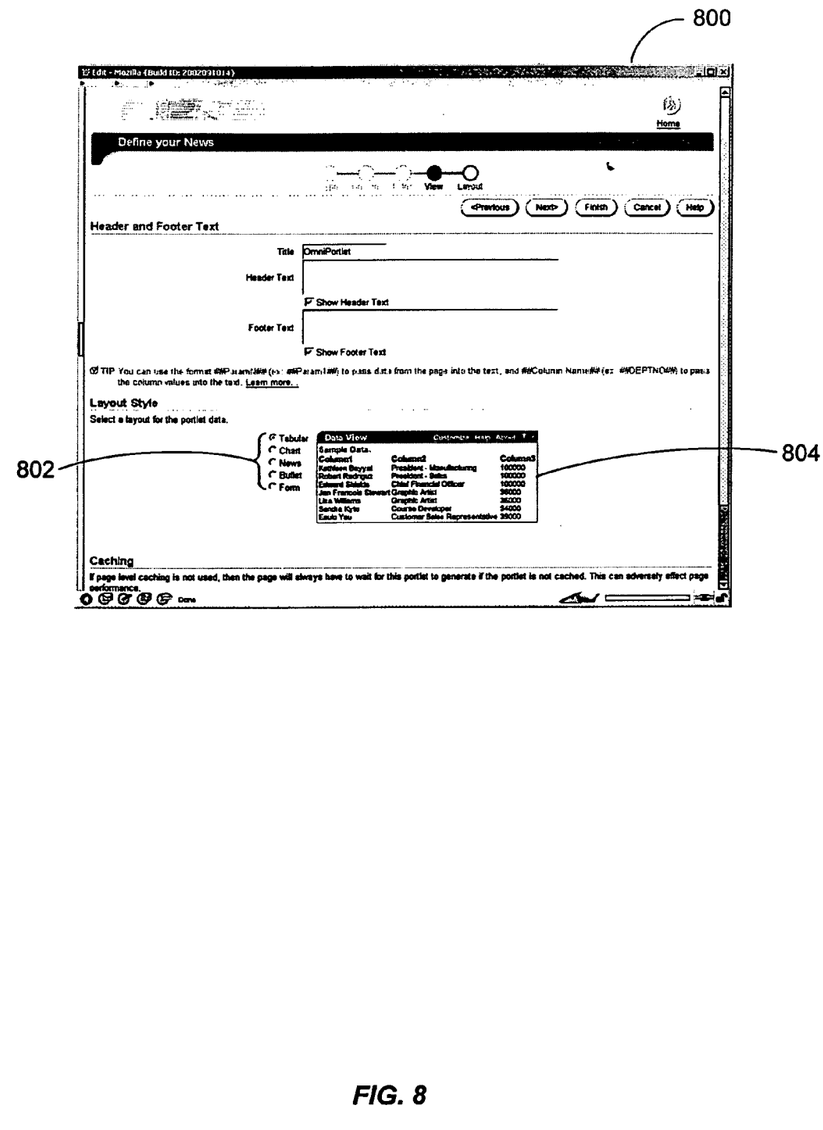
FIG. 8 depicts an interface for declaratively specifying layout options according to one embodiment of the present invention.

FIG. 8 depicts an interface 800 for declaratively specifying layout options according to one embodiment of the present invention. As shown, a layout type 802 may be selected to specify the layout type. Depending on the layout type selected, a preview of the data for the selected layout type is shown in entry 804.

In step 408, a declarative specification for the layout options is determined. When a user declaratively specifies the layout option in step 406, a declarative specification of the layout options is determined from the input information. The declarative specification includes information that is used to generate a portlet 102 with the specified layout options.

In step 410, a layout specification based on the declarative specifications for the layout type and layout options is generated. In one embodiment, the layout specification may be information that is used to generate a portlet 102 with the layout for data that a user declaratively specified.

Figure 5:
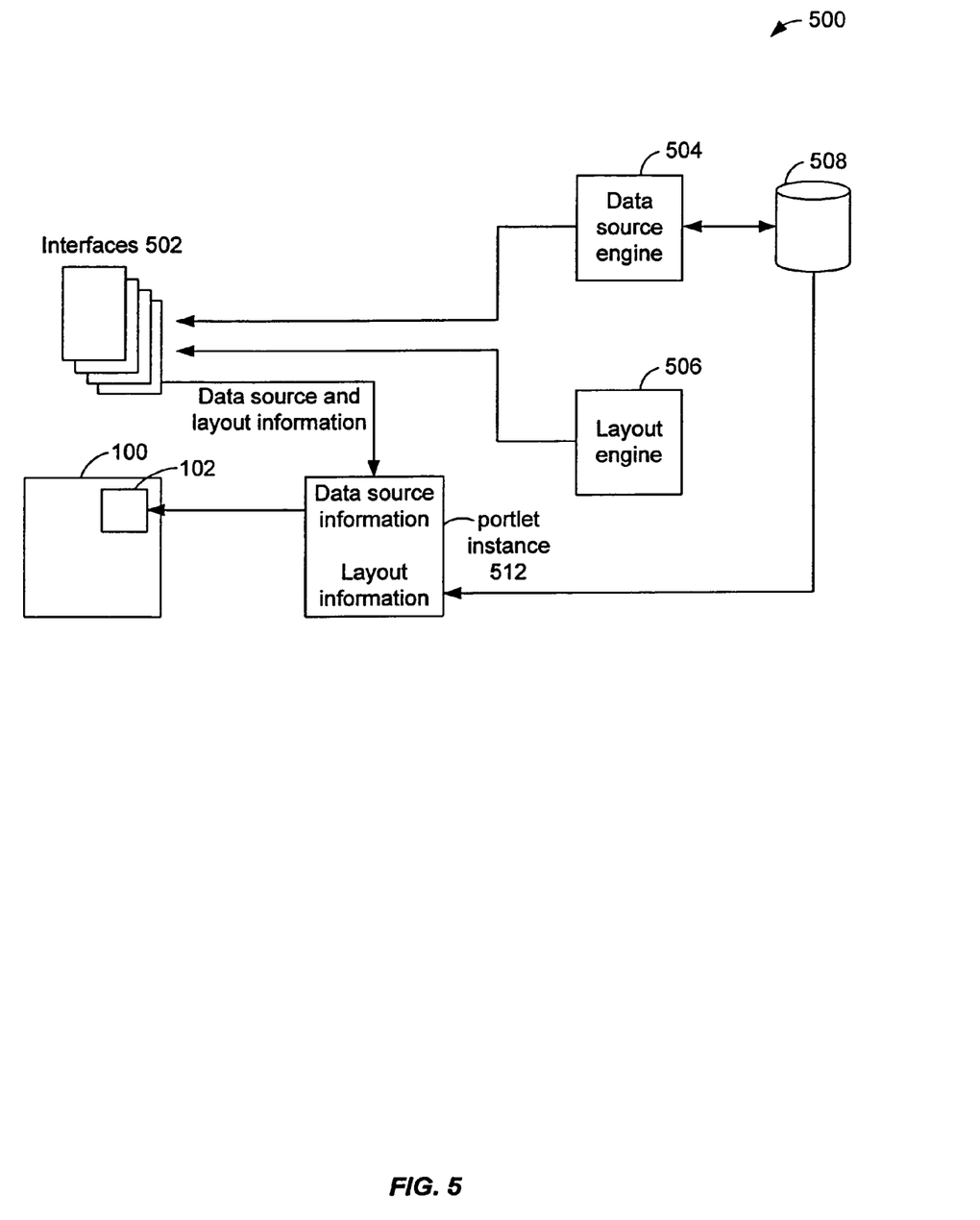
FIG. 5 depicts a system for generating a portal page using a declarative specification according to one embodiment of the present invention.

FIG. 5 depicts a system 500 for generating a portal page using a declarative specification according to one embodiment of the present invention. System 500 includes interfaces 502, a data source engine 504, a layout engine 506, and a portlet instance 512.

Data source engine 504 is configured to generate interfaces 502 that enable a user to declaratively specify a data source. Once a data source is declaratively specified, data source engine 504 is configured to access data for the data source stored in a database 508. Depending on the data type of the data source and the access information provided, data source engine 504 may use various methods for accessing database 508. For example, a URL may be used to access information for an XML database and an HTTP protocol may be used to retrieve information in a web page, etc.

Data source engine 504 includes drivers for retrieving data of any data type using access information as specified through interfaces 502. The drivers are compatible with the interfaces outputted in that the drivers are configured to read information that was declaratively specified using the interfaces. The information is then used to retrieve data.

When a user declaratively specifies the data source, information for the data source is stored in a portlet instance 512. For example, the data source information may include access information for the data source, its data type, and any filtering information for the data.

Layout Engine 506 is configured to output interfaces 502 that enable a user to declaratively specify layout information for the data source specified. In one embodiment, data from database 508 is displayed in an interface 502 and the user may select or specify layout options for the data.

Once the layout information is declaratively specified using interfaces 502, the layout information is stored in a portlet instance 512. The layout information may include the layout type and any layout options specified.

Accordingly, portlet instance 512 is declaratively specified by a user. The declarative specification is stored in portlet instance 512 and can be used to generate a portlet 102 in portal 100. The information may be used by software code to generate a portlet 102. In this case, many portlet instances 512 may be created using software code that is configured to generate portlets 102 from the information in each portlet instance 512. For example, as mentioned above, a data driver or renderer generates portlet 102 using the information that was declaratively specified. The data driver and outputted interfaces are developed such that information declaratively defined using the interfaces may be interpreted by the data driver to generate portlet 102. In one embodiment, the declarative specification comprises meta-data that is used by the data driver to generate portlet 102. In another embodiment, software code is generated using the declarative specification where the software code generates portlet 102.

In creating portlets 102, data from database 508 is retrieved using the data source information and formatted according to layout information in portlet instance 512. Portlet 102 is then generated and displayed in portal 100.

Accordingly, embodiments of the present invention enable a portlet to be declaratively specified. A portlet is then generated from the declarative specifications. A data source may be specified in addition to how to lay out data from the data source. Thus, a user can specify the data to be accessed and displayed, and how to lay it out. Previously, a user would have to write software code for the portlet using a programming language. However, using embodiments of the present invention, a user does not have to write software code. Rather, a user may declaratively specify a portlet. Accordingly, time that a user would have to wait for development to build, test, deploy a portlet is avoided. Thus, time to market for a portal page is reduced.

While the present invention has been described using a particular combination of hardware and software implemented in the form of control logic, it should be recognized that other combinations of hardware and software are also within the scope of the present invention. The present invention may be implemented only in hardware, or only in software, or using combinations thereof.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope of equivalents.

What is claimed is:

1. A method for generating a portal page having a plurality of portlets, at least one of the plurality of portlets is declaratively defined by an end-user of the portal page to display data from a data source, the method comprising:

receiving, from the end-use via a user interface, a selection of a data source type from a plurality of data source types supported by a portlet;

receiving, from the end-use via the user interface, access information required to access a data source based upon the selected data source type;

receiving, from the end-use via the user interface, layout information including at least a layout style supported by the portlet;

determining, with a computer system, a data source specification for the portlet based on the selected data source type and the access information associated with the data source;

determining, with the computer system, a layout specification for the portlet based on the layout information;

retrieving data from the data source using the determined data source specification;

determining, with the computer system, a layout within the portlet for the data retrieved from the data source using the determined layout specification;

generating the portlet to display the retrieved data using the determined layout within the portlet; and generating, with the computer system, the portal page using the generated portlet.

2. The method of claim 1, wherein the data source types at least one of a spreadsheet data source type, XML data source type, SQL data source type, web service data source type, and a web page data source type.

3. The method of claim 1, wherein determining the data source specification for the portlet based on the selected data source type and the access information associated with the data source comprises determining a path to the data source.

4. The method of claim 3, wherein determining the path comprises determining a URL.

5. The method of claim 1, wherein determining the data source specification for the portlet based on the selected data source type and the access information associated with the data source comprises determining a filtering specification for the portlet based on filter information received from the end-user.

6. The method of claim 1, wherein the layout styles includes at least one of a tabular layout, chart layout, news layout, form layout, and bullet layouts.

7. The method of claim 1, wherein determining the layout within the portlet for the data retrieved from the data source comprises formatting the data retrieved from the data source according to the selected layout style.

8. The method of claim 1, wherein the portal page comprises a web-based page.

9. The method of claim 1, wherein the portal page comprises a non web-based page.

10. A method for generating a user-customizable graphical user interface (GUI), the method comprising:

receiving a data source type selected by a user via one or more GUIs from a plurality of data source types supported by an object to be included on the user-customizable GUI;

receiving access information identifying a data source for the object of the data source type selected by the user via the one or more GUIs;

determining a declarative specification for the object, using a computer system, based on the selected data source type and the access information associated with the data source;

retrieving, using the computer system, data for the data source using the access information in the declarative specification for the object;

receiving layout information for the data obtained from the data source, the layout information including at least a layout style from a plurality of layout styles presented by the one or more GUIs that are supported by the object;

determining a layout specification for the object using the computer system based on the layout information; and generating, using the computer system, the object based on the declarative specification, the data obtained from the data source, and the layout specification, the generated object being first code to be included on the user-customizable GUI and configured to generate second code creating a graphical display when included on the user-customizable GUI.

11. The method of claim 10, wherein the plurality of data source types comprise at least two of a spreadsheet data source type, XML data source type, SQL data source type, web service data source type, and a web page data source type.

12. The method of claim 10, wherein the access information comprises a URL.

13. The method of claim 10, further comprising receiving filtering options provided by the user via the one or more GUIs for the retrieved data; and wherein generating, using the computer system, the object based on the declarative specification, the data obtained from the data source, and the layout specification further includes generated the object based one the filtering options.

14. The method of claim 10, wherein the selected layout type comprises at least one of a tabular layout, chart layout, news layout, form layout, and bullet layout.

15. The method of claim 10, further comprising receiving information specifying how the object should be laid out in the user-customizable GUI.

16. The method of claim 10, wherein the user-customizable GUI comprises a web-based page.

17. The method of claim 10, wherein the object of the user-customizable GUI comprises a portlet.

18. A method for declaratively generating a page using a computer interface provided for an end-user to define objects that generate display code for data when associated with the page, the method comprising:
receiving first input from the end-user during one or more interactive sessions between the end-user and the interface, the first input indicative of a data source type selected from a plurality of data source supported by an object;
receiving second input from the end-user during one or more interactive sessions between the end-user and the interface, the second input indicative of access information identifying a data source for the object of the data source type selected by the end-user;
retrieving, using a computer system, data from the data source using the access information;
receiving third input from the end-user during one or more interactive sessions between the end-user and the interface, the third input indicative of layout information including at least a layout style from a plurality of layout styles supported by the object;
generating software coding representing the object, using a computer system, based on the selected data source type, the access information, and the layout information; and
generating the page using the generated software coding representing the object, the object creating display code for the retrieved data when included on the generated page.

19. The method of claim 18, wherein receiving the first input comprises receiving a declarative specification of the data source type for the data source.

20. The method of claim 18, wherein the access information comprises a path to the data source.

21. The method of claim 20, wherein the path comprises a URL.

22. The method of claim 18, wherein receiving the first input or the second input further comprises receiving a filtering specification that filters the data retrieved from the data source.

23. The method of claim 18, wherein the page comprises a web-based page.

24. The method of claim 18, wherein the object on the page comprises a portlet.

* * * * *

UNITED STATES PATENT AND TRADEMARK OFFICE
CERTIFICATE OF CORRECTION

PATENT NO. : 8,612,852 B2  
APPLICATION NO. : 10/676829  
DATED : December 17, 2013  
INVENTOR(S) : Burns et al.

Page 1 of 1

It is certified that error appears in the above-identified patent and that said Letters Patent is hereby corrected as shown below:

In the Claims

In column 9, line 44, in Claim 1, delete "end-use" and insert -- end-user --, therefor.

In column 9, line 47, in Claim 1, delete "end-use" and insert -- end-user --, therefor.

In column 9, line 50, in Claim 1, delete "end-use" and insert -- end-user --, therefor.

In column 11, line 4, in Claim 13, delete "one" and insert -- on --, therefor.

Signed and Sealed this  
Twenty-ninth Day of July, 2014

Michelle K. Lee  
*Deputy Director of the United States Patent and Trademark Office*